Nov. 29, 1938.　　A. L. ARMENTROUT ET AL　　2,138,057
METHOD AND APPARATUS FOR TESTING WELLS
Filed Dec. 11, 1935　　3 Sheets-Sheet 2

Inventors
Arthur L. Armentrout
and
Elwin B. Hall
By
Their Attorney

Nov. 29, 1938.  A. L. ARMENTROUT ET AL  2,138,057

METHOD AND APPARATUS FOR TESTING WELLS

Filed Dec. 11, 1935  3 Sheets-Sheet 3

Inventors
ARTHUR L. ARMENTROUT
and
ELWIN B. HALL
By
Their Attorney

Patented Nov. 29, 1938

2,138,057

UNITED STATES PATENT OFFICE 2,138,057

METHOD AND APPARATUS FOR TESTING WELLS

Arthur L. Armentrout, Santa Maria, and Elwin B. Hall, Los Angeles, Calif., assignors, by mesne assignments, to Security Engineering Co., Inc., Whittier, Calif., a corporation of California Application December 11, 1935, Serial No. 53,922

23 Claims. (Cl. 166—1)

This invention relates to the drilling of wells and relates more particularly to a method and apparatus for testing wells. A general object of this invention is to provide a practical economical method for testing wells and a simple, effective well testing apparatus.

It has been found advantageous to determine the character and productivity of the earth formation encountered in a well during the well drilling operations. Core drills are usually employed to obtain samples of the earth formation from time to time as the drilling progresses and when the core or sample obtained by a core drill indicates the presence of a productive sand or stratum it is usual the employ what is known as a well tester to more accurately determine the productivity of the earth formation. The forms of well testers now in general use are expensive and their use often causes great delay and occasions expensive fishing operations. A typical well tester comprises a tubular metal body fixed to a tubular test string, valves in the body and a packer fixed on the body for sealing off the portion of the well to be tested. When a typical well tester has been arranged in the well and its packer set its valve is opened by manipulating the string or by dropping a weight through the test string. This operation of the valve causes the packer to be tightly wedged in the well and as the valve is usually opened very quickly the pressure below the packer is suddenly relieved causing the high hydrostatic pressure in the well to more tightly force the packer into the well bore. Thus the packer of a typical well tester often becomes so tightly lodged in the well that the tester cannot be withdrawn following the test necessitating an expensive fishing operation to remove the caught tester and if this fails necessitating the side tracking of the well past the lost tester or the abandonment of the well.

Another object of this invention is to provide a method for testing the productivity of the well that does not endanger the well or require an expensive time consuming fishing operation.

Another object of this invention is to provide a method for testing the productivity of a well that is rapid and that assures the full determination of the character of the fluid in the stratum tested and its rate of flow or discharge.

Another object of this invention is to provide a method for testing the formation in a well bore that does not require the dropping of weights or other objects in the well and that may be successfully carried out with simple equipment.

Another object of this invention is to provide apparatus for testing a well that does not permanently obstruct the well or necessitate an expensive fishing operation in the event that it becomes caught in the well.

Another object of the invention is to provide a well testing apparatus that comprises packing or sealing parts formed of drillable material or material that may be readily drilled up which parts are removably associated with the test string and the metal elements to permit the movement thereof from the well in the event that the packing or sealing parts become caught whereby the drilling of the well may be continued without fishing out the lost packing parts.

Another object of this invention is to provide a well testing apparatus that includes a perforated section or liner for receiving the fluid from the earth formation that is shaped to be readily freed from the well in the event that the well bore caves in or becomes sanded up and that is weakened adjacent its connection with the body of the tester so that it may be easily broken at this point to remain in the well and allow the removal of the tester body and test string in the event that it becomes immovably caught in the well due to caving of the well walls.

Another object of this invention is to provide a well testing apparatus that embodies an improved valve that may be cracked or slightly opened to permit a slow initial flow of fluid from below the packer into the test string and then opened by stages or degrees to permit a slow increase in the rate of flow into the test string so that the packer and the walls of the open well bore are not subjected to the effects of a sudden reduction in fluid pressure below the packer.

A further object of this invention is to provide a well testing apparatus that is simple and inexpensive of manufacture and that is easy to operate and control.

The various objects and features of my invention will be fully understood from the following detailed description of typical preferred forms of my invention and the manner of carrying out the method of the invention, throughout which description reference is made to the accompanying drawings, in which:

The apparatus of the present invention is adapted to be embodied in several forms for use in various situations and under various conditions. In the following detailed disclosure we will described several typical embodiments of the apparatus and will follow the descriptions of the various embodiments with the manners of carrying out the method of the invention in connection with their operation.

The form of well testing apparatus illustrated in Figs. 1 to 5, inclusive, of the drawings includes, generally, a tubular body 10 adapted to be connected with the lower end of a tubular test string S, a screen or liner 11 on the lower end of the body 10 adapted to extend into a rat-hole H in the lower end of the well bore B, a packer 12 associated with the liner 11 to seal the well above the rat-hole H and to permit the upward withdrawal of the liner 11 and the body 10, and a valve 13 in the body 10 for controlling the flow of the well fluid through the body.

Figures 1, 2, 3, 4, 5:
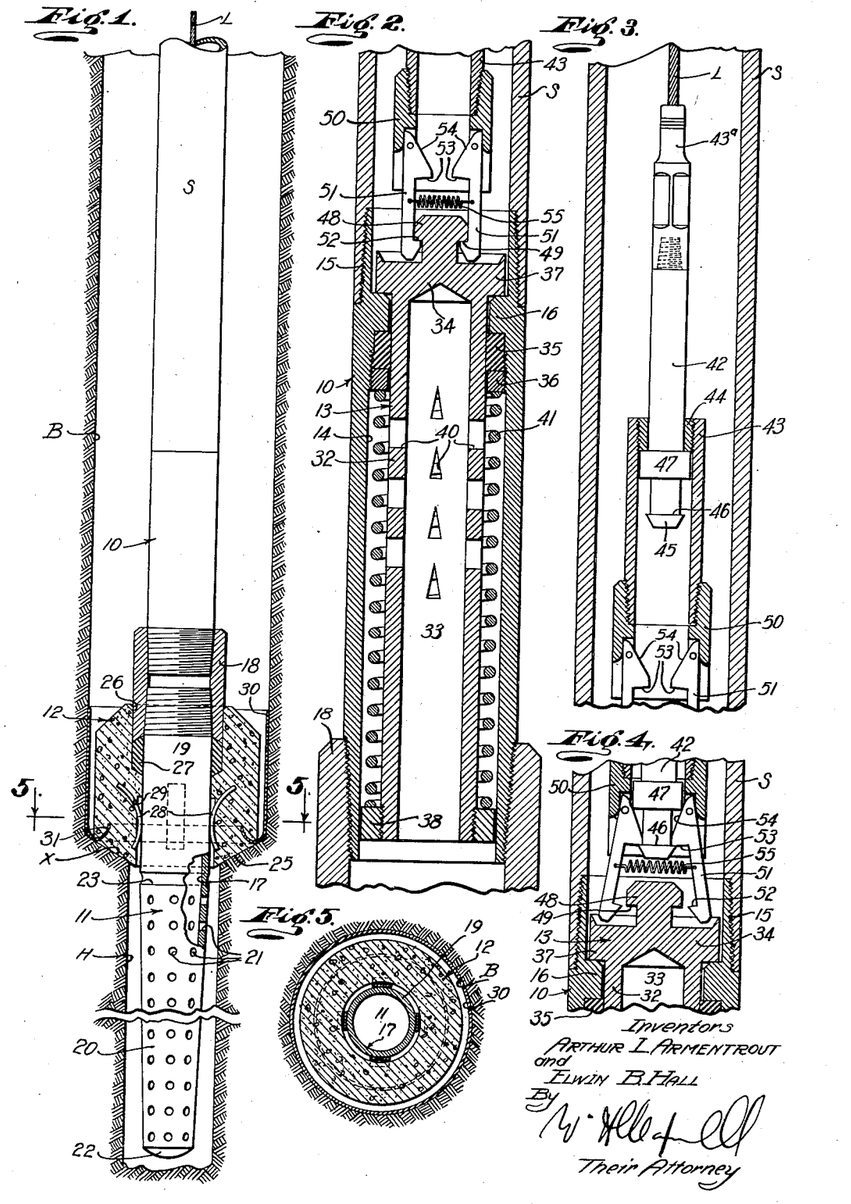
Fig. 1 is a side elevation of one form of the testing apparatus provided by this invention with portions appearing in vertical cross section showing the tester in the operative position in the well to perform the method of the invention.
Fig. 2 is an enlarged fragmentary longitudinal detailed sectional view of the body and the valve of the apparatus.
Fig. 3 is an enlarged fragmentary longitudinal detailed sectional view illustrating the device for controlling and operating the valve.
Fig. 4 is an enlarged fragmentary longitudinal detailed sectional view illustrating the device for controlling and operating the valve showing the latch fingers of the valve operating device released from the valve.
Fig. 5 is a transverse detailed sectional view taken as indicated by line 5—5 on Fig. 1.

The body 10 is provided to connect the liner 11 with the test string S, to conduct the well fluids upwardly to the test string S and to carry or contain the valve 13. In accordance with the invention the body 10 may be a simple elongate tubular member having a central longitudinal opening 14. The upper end of the body 10 is suitably connected with the test string S. In the typical application of the invention illustrated in the drawings a threaded connection 15 secures the upper end of the body 10 to the lower end of the tubular test string S. An annular inwardly projecting shoulder 16 may be provided on the wall of the body opening 14 adjacent the upper end of the body 10 to support the valve 13.

The liner 11 is provided to receive the well fluid flowing from the stratum to be tested and to conduct the well fluid upwardly into the tubular body 10. The liner 11 is an elongate member adapted to properly project into the rat-hole H and has a central longitudinal opening 17. The upper end of the liner 11 is connected with the lower end of the body 10 by a suitable adapter or coupling 18 so that the upper end of its opening 17 is in communication with the lower end of the body opening 14. In accordance with the invention the upper portion 19 of the liner 11 is imperforate while the major lower portion 20 of the liner 11 is ported or perforated being provided with a multiplicity of longitudinally and circumferentially spaced openings 21. The ports or openings 21 are provided for conducting the well fluids to the liner opening 17 and are preferably comparatively small so that the liner operates to screen the fluid before it enters the tester. The lower end of the liner 11 may be closed by an integral wall or cap 22.

It is a feature of the invention that the liner 11 is shaped to be readily removed from the rat-hole H in the event that the rat-hole stands up or caves in. The perforated lower portion 20 of the liner 11 is longitudinally tapered or of downwardly diminishing diameter being smaller in diameter at its lower end. The liner portion 20 being of this configuration may be readily pulled upwardly from the rat-hole H if the rat-hole caves in or sands up. In accordance with the invention the liner H is weakened so that it may be broken to permit the disassociation of the upper portion 19 from the lower portion 20 in the event that the lower portion 20 becomes caught in the rat-hole H whereby the body 10 and the string S may be removed from the well. A circumferential groove 23 is provided in the exterior of the liner 11 adjacent the line of connection or joinder of the portions 19 and 20. The groove 23 is sufficiently deep to permit the more or less easy breaking of the liner 11 at the groove if its lower portion 20 is immovably caught in the rat-hole H. Following the breaking of the liner at the groove 23 its upper portion 19 connected with the body 10 may be withdrawn from the well together with the body and the string S.

The packer 12 is provided to seal against the shoulder X of earth formation occurring at the upper end of the rat-hole H and to seal about the imperforate portion 19 of the liner 11 to prevent the entrance of fluid from the main bore B into the rat-hole H whereby the tester is adapted to obtain an uncontaminated sample or test of the fluids produced by the stratum penetrated by the rat-hole H. The invention provides a connection between the liner 11 and the packer 12 that permits the upward withdrawal of the liner 11 through the packer 12 in the event that the packer becomes immovably caught in the well and contemplates the formation of the packer 12 of friable material or material that may be readily drilled so that it may be easily drilled up if left in the well following the removal of the liner 11 on the string S upon completion of the test.

The packer 12 is an annular or tubular member surrounding the imperforate upper portion 20 of the liner 11. In accordance with the invention the packer 12 is formed of cement, Bakelite, glass, marble or other material that is frangible or friable and readily broken and drilled up by a well bit. The packer 12 is proportioned to fit the well bore B with suitable clearance and its lower end 25 is shaped to properly seat on the shoulder X of the earth formation. In the particular form of the invention being described the lower end 25 of the packer 12 is inclined downwardly and inwardly to properly bear on the correspondingly inclined shoulder X. A counterbore 26 may be provided in the upper end of the tubular packer 12 to receive the lower end portion of the coupling 18. Packing 27 is arranged in the counter-bore 26 between the lower end of the coupling 18 and the lower wall of the counterbore. When the weight or a portion of the weight of the test string S is imposed on the packer 12 to hold it on the seat X the pressure or weight is transmitted through the packing 27 to compress the packing so that it tightly seals with the liner 11 and the packer 12 to prevent the leakage of fluid through the packer.

The means for releasably or detachably connecting the liner 11 and the packer 12 to permit upward withdrawal of the liner 11 through the packer 12 comprises members 28 on the packer 12 for contacting the portion 19 of the liner 11. The members 28 are in the nature of bowed leaf springs having their end portions received in openings 29 in the friable packer 12. There may be a plurality of circumferentially spaced spring members 28. The members 28 may be cast in the packer 12 or may be inserted in the openings 29 subsequent to the casting of the packer 12. The spring members 28 are capable of exerting sufficient inward force or pressure on the liner portion 19 to dependably hold the packer 12 on the liner 11 when the apparatus is run into the well and are adapted to yield when the liner 11 is pulled upwardly through the packer 12, if the packer is caught in the bore, to allow the removal of the test string S, the body 10 and the liner 11 from the well.

The invention provides a novel effective sealing element on the packer 12 for sealing with the side wall of the well bore B. The sealing element of the packer 12 is in the form of a basket 30 and is expansible under pressure to seal outwardly against the wall of the bore B. The basket 30 is a tubular member of rubber or the like surrounding the packer 12 in spaced relation to its periphery. The basket 30 is preferably comparatively long and may extend from adjacent the lower end of the packer 12 to a point above or adjacent the upper end of the packer. The lower end of the basket 30 is closed and the upper end of the basket is open to the well bore B. The lower end of the basket 30 may be closed by embedding or casting its lower portion 31 in the packer 12 as illustrated in Fig. 1 of the drawings.

To actuate the basket 30 to seal outwardly against the wall of the well bore B pressure may be applied to the fluid in the well bore to act against the internal wall of the basket and thus force the basket tightly against the wall of the well. The basket 30 is formed of a material that permits it to expand under pressure and to conform to the shape of the well bore. Thus the expansible basket 30 is adapted to conform to irregularities in the wall of the well bore B and to tightly seal against the wall of the bore to prevent the leakage of fluid downwardly around the packer 12 into the rat-hole H. Following the setting of the packer 12 the hydrostatic pressure in the well bore may be sufficient to actuate or expand the basket 30 to seal with and conform to the wall of the bore.

The valve 13 is provided to control the admission of fluid under pressure from the rat-hole H below the packer 12 to the test string S. The valve 13 includes a tube 32 shiftable longitudinally in the opening 14 of the body 10. The valve tube 32 is shiftable longitudinally through the flange 16 and has suitable clearance with the wall of the body opening 14. The lower end of the opening 33 in the tube 32 is open to communicate with the opening 17 of the liner 11. A head or cap 34 closes the upper end of the opening 33. The cap 34 may be an integral part of the valve tube 32. An annular body of packing 35 is arranged against the lower side of the flange 16 and is compressed by a nut 36 threaded into the body 10. The packing 35 is adapted to seal with the interior of the body 10 and the exterior of the valve tube 32 to prevent the leakage of fluid upwardly around the tube. An outwardly projecting flange 37 is provided on the tube 32 at or adjacent the cap 34 to cooperate with the upper side of the body flange 16 and support the tube 32 against downward movement through the body. The flange 16, the packing 35 and the nut 36 operate to shiftably guide the upper end portion of the valve tube 32. A nut 38 is provided on the lower end of the tube 32 and may assist in guiding the tube.

A plurality of circumferentially and longitudinally spaced ports 40 is provided in the wall of the tube 32 to communicate with the tube opening 33. The ports 40 are adapted to come into communication with the upper portion of the body opening 14 above the flange 16 and the interior of the string S when the tube 32 is moved upwardly. The ports 40 are preferably of upwardly diminishing width to gradually move into full communication with the opening 14 above the flange 16 as the tube moves upwardly. The valve ports 40 are preferably related so that as the tube 32 moves upwardly the aggregate area of the ports 40 open to the opening 14 above the flange 16 gradually increases so that there are no surges or sudden increases in the flow through the valve. In the structure illustrated in the drawings the valve ports 40 are arranged in vertical rows, the ports 40 of adjacent rows being out of horizontal alignment whereby a port comes into communication with the opening 14 above the flange 16 as another port obtains full communication with the opening above the flange. Means is provided for normally holding the valve tube 32 in its down or closed position illustrated in Fig. 2 of the drawings. A helical spring 41 surrounds the valve tube 32 and is under compression between the nut 36 and the nut 38 to yieldingly urge the valve tube 32 downwardly. The spring 41 is sufficiently strong to hold the valve tube 32 in its closed position until the valve tube is deliberately or intentionally moved upwardly.

The invention provides simple effective means for operating and controlling the valve 13. The valve 13 is adapted to be controlled by a cable or line L passed downwardly through the test string S and the tool or means for controlling the valve 10 includes a mandrel 42 secured to the lower end of the line L by a rope socket 43ª or the like. The mandrel 42 enters the upper end of an outer part or tube 43 being slidably guided therein by a guide 44 in the upper end of the tube. A tapered head 45 is provided on the lower end of the mandrel 42 and presents an upwardly facing annular shoulder 46. A flange 47 is provided on the lower portion of the mandrel 42 above the head 45 to cooperate with the guide 44 and limit relative movement between the mandrel and tube 43. The cap 34 of the valve tube 32 has an upstanding projection 48 provided with a downwardly facing annular shoulder 49 and the tube 43 carries means for cooperating with the projection 48.

The tube 43 has an enlarged extension 50 on its lower end carrying two pivoted latch fingers 51. Each latch finger 51 has an upwardly facing latch shoulder 52 adjacent its lower end and a downwardly facing shoulder 53 on its inner side adjacent its upper end. Inclined surfaces 54 extend upwardly and outwardly from the shoulders 53. Means is provided for urging the pivoted latch fingers 51 inwardly or toward one another. In practice a coiled spring 55 may be connected between the spaced opposing fingers 51. The latch fingers 51 are adapted to cooperate with the projection 48 when the line L is lowered through the string S. The engagement of the lower ends of the fingers 51 with the projection 48 pivots the fingers outwardly so that they move downwardly over the projection until their shoulders 52 snap under the shoulder 49. The upper surface of the cap 34 may limit the downward movement of the fingers 51. When the latch fingers are in cooperation with the shoulder 49 the line L is connected with the valve tube 32 so that the line may be operated to move the valve tube upwardly. When it is desired to release the fingers 51 from the projection 48 the line L is lowered until the tapered head 45 of the mandrel 42 moves downwardly against the inclined surfaces 54 of the fingers to spread the fingers apart. This spreading of the fingers 51 releases their shoulders 52 from the shoulder 49. The head 45 of the mandrel 42 moves downwardly on the surfaces 54 until its shoulder 46 snaps under the latch finger shoulders 53. This engagement of the parts is illustrated in Fig. 4 of the drawings. With the latch fingers held out by the engagement of the shoulders 46 and 53 they are prevented from re-engaging the projection 48 so that the line L may be removed from the string.

The operation of the apparatus illustrated in Figs. 1 to 5, inclusive, of the drawings and the method of the invention as carried out with this form of the invention is as follows: Assuming that the rat-hole H has been provided or formed in the lower end of the well bore the tester body 10 carrying the liner 11, the packer 12 and the valve 13 is attached to the lower end of the test string S and the string is run into the well bore B. The string S is lowered into the well until the lower end 25 of the packer 12 seats on the shoulder X of formation. The weight or a portion of the weight of the string S is allowed to rest on the packer 12 forcing the lower end 25 of the packer tightly against the shoulder X. This weight imposed on the packer 12 is transmitted through the packing 27 compressing the packing to tightly seal with the interior of the packer and the exterior of the imperforate portion 19 of the liner 11. If desired or believed necessary the fluid in the well bore B may be put under pressure to expand the basket 30 which forms an effective seal above the shoulder X. Thus the packer 12 seals off the well bore at the shoulder X and at the basket 30 to fully separate the rat-hole H from the bore B. The tester or apparatus is then conditioned for operation.

To operate the valve 13 the line L carrying the mandrel 42 and the tube 43 is run into the test string S until the latch fingers 51 contact the projection 48. This engagement of the latch fingers 51 with the projection 48 spreads the fingers so that their shoulders 52 snap into engagement with the shoulder 49. When this occurs the line L has lifting cooperation or engagement with the valve tube 32. The valve 13 is then opened by pulling up on the line L. It is preferred to raise the line L slowly so that the upper ends of the uppermost ports 40 are slowly uncovered to the opening 14 above the flange 16. This allows the fluid under pressure from the rat-hole H to flow into the test string S. As the line L is slowly raised the sets of ports 40 are successively uncovered to the opening 14 above the flange 16 to permit a larger flow of fluid from the rat-hole H into the test string. It is to be particularly noted that this operation of the valve B provides for the gradual or slow reduction in pressure on the fluid in the rat-hole H so that the packer 12 and the parts connected therewith are not subjected to a sudden increase in the force exerted by the hydrostatic head of fluid in the well bore B. This slow reduction of pressure in the rat-hole H may assist in preventing caving and sanding up of the rat-hole H. If the fluid in the stratum penetrated by the rat-hole H flows in sufficient quantities and under sufficient pressure it may flow upwardly through the test string S to the upper end of the well. If the fluid does not flow from the rat-hole H in sufficient volume it may be necessary to bail, pump or otherwise remove the test fluid from the string S. In any event the test string S is adapted to receive a sample of the fluid produced from the formation penetrated by the rat-hole H which test or sample is uncontaminated by the mud or fluid in the well bore B. The expanded basket 30 insures a dependable seal between the rat-hole H and the well bore B which seal is supplemented by the engagement of the lower end of the packer 12 with the shoulder X.

When a sufficient sample or test has been obtained the line L is released from the valve tube 32 to permit closing of the tube to trap the test fluid in the string S. To disengage the line L from the valve tube 32 the line L is allowed to lower until the head 45 of the mandrel 42 engages the inclined shoulders 54 which pivots the latch fingers 51 outwardly to a position such as illustrated in Fig. 4 of the drawings whereupon the latch fingers 51 cooperate with the shoulder 46. The line L is then raised and removed from the well carrying with it the mandrel 42 and the tube 43. The disengagement of the latch fingers 51 from the projection 48 is accompanied by downward movement of the valve tube 32 by the compressed spring 41. This, of course, moves the ports 40 out of communication with the opening 14 above the shoulder 16 so that the tube 32 closes the lower end of the string S to trap the sample therein. The string S is then raised to remove the apparatus from the well bore. In the event that pressure has been maintained on the fluid within the well bore B this pressure is removed before removing the tester.

In most instances the tester on the lower end of the string S is readily withdrawn from the well on the string. The perforated portion 20 of the liner L being downwardly tapered is easily pulled from the rat-hole H even though the rat-hole may be sanded up or caved in. In the event, however, that the packer 12 is immovably lodged in the well so that it is not moved upwardly with the string S, the liner 11 may pull upwardly through the caught packer. The upward movement of the string S relieves all pressure on the packing 27 and the spring members 28 yield to allow the liner 11 to be pulled upwardly through the packer 12. Thus if the packer 12 is caught or tightly lodged in the well the liner 11 and the body 10 may be readily pulled from the well on the string S leaving the friable packer 12 in the well. The drillable packer 12 carrying the basket 30 may be easily broken up and drilled up by a drilling tool following the test to permit the drilling operations to continue. Accordingly, the fixation or loss of the packer 12 in the well bore does not result in the loss of the other parts of the testing apparatus and does not in any way endanger the well bore or necessitate expensive fishing operations.

In some cases the liner 11 may be so tightly sanded or fixed in the rat-hole H that it cannot be withdrawn from the well bore on the string S without endangering the connections of the string, etc. If this occurs the string S is pulled upwardly and manipulated to fracture or break the liner 11 at the groove 23 allowing the body 10 and the valve 13 contained therein to be withdrawn from the well on the string S. If the packer 12 is not tightly caught in the well it may also be withdrawn on the string S leaving only the perforated portion 20 of the liner in the well. This small end portion of the liner L may be easily fished from the well bore or if desired may be drilled up when drilling is resumed. From the above it will be seen that the operation of the form of the invention illustrated in Figs. 1 to 5, inclusive, of the drawings does not endanger the well bore and does not in any instance necessitate expensive time consuming fishing operations.

The method of the invention as carried out in the operation of the form of the invention just described involves the setting of the tester in the well bore, the application of pressure to the fluid in the bore to expand the liner basket 30, the opening of the valve 13 to permit the test fluid to flow into the test string S, the closing of the valve 13, the withdrawal of the string S and the body 10 and liner 11 connected therewith, and then the drilling up of the drillable packer 12 in the event that it is caught in the well bore.

Figure 6:
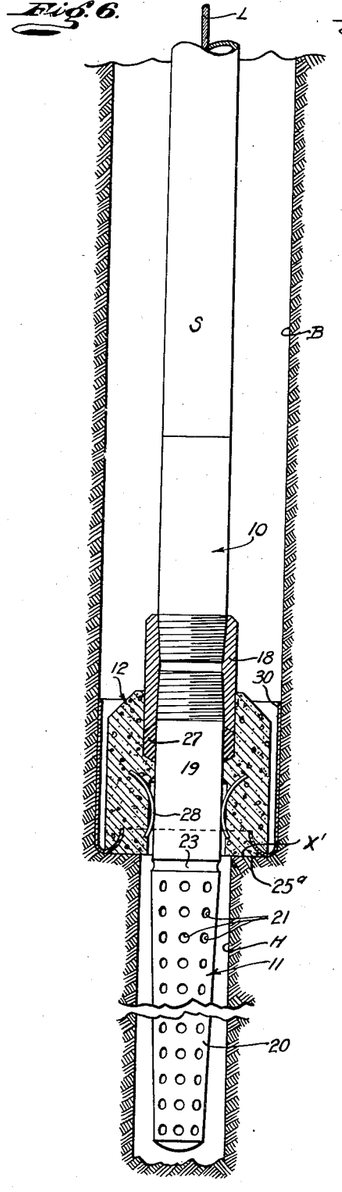
Fig. 6 is a side elevation of a form of the apparatus embodying a slightly modified type of packer illustrating the packer and adjacent parts in vertical cross section.

Fig. 6 of the drawings illustrates a form of apparatus identical with the embodiment of the invention illustrated in Figs. 1 to 5 of the drawings, except that the lower end 25a of the packer 12 is flat and substantially horizontal. This type of packer is adapted to have its lower end 25a bear on and seal with a flat horizontal shoulder $X^1$ of earth formation occurring in the well bore B at the upper end of a rat-hole H. In other respects the packer 12 and the various other parts of the apparatus may be identical with the corresponding elements of the apparatus described above and the operation of the apparatus shown in Fig. 6 is the same as the operation of the previously described form of the invention.

Figure 7:
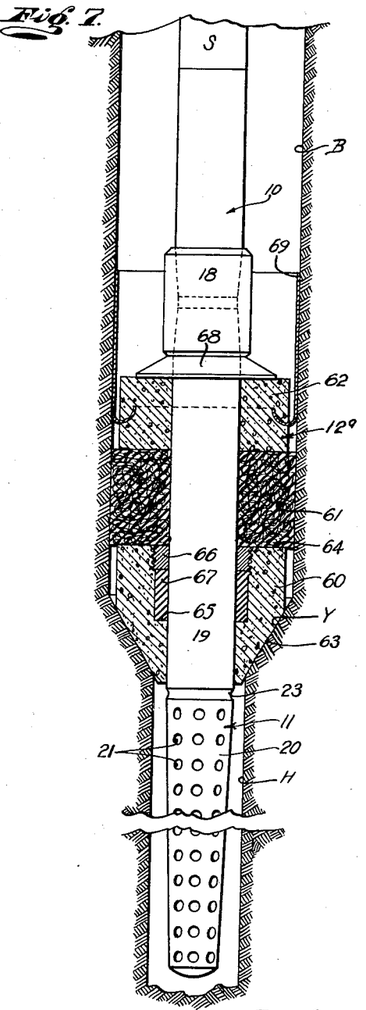
Fig. 7 is a side elvation of still another form of the apparatus showing it in the operative position in a well and illustrating the packer in vertical cross section.

Fig. 7 of the drawings illustrates an embodiment of the invention having another form or type of packer 12a. The body 10. the liner 11 and the valve 13 within the packer 10 may be of the same construction and operation as the corresponding elements of the apparatus illustrated in Figs. 1 to 5 of the drawings. The packer 12a illustrated in Fig. 7 of the drawings includes a lower drillable part 60 adapted to seal against a shoulder Y in the well bore B occurring at the upper end of the rat-hole H, a body of packing 61 resting on the upper end of the lower packer part 60 and a drillable upper packer part 62 at the upper end of the packing 61 for transmitting downward force from the test string S to the packing 61 to compress the packing and force it against the wall of the well bore B.

The lower packing part 60 is tubular or annular and surrounds the imperforate portion 19 of the liner 11. In accordance with the invention the part 60 is frangible or drillable being formed of cement glass, Bakelite or other material that may be crushed and drilled up by a well drilling tool. The lower end 63 of the packer part 60 tapers downwardly and inwardly to conform to and seal against the shoulder Y of earth formation. The upper end 64 of the packer part 60 is preferably flat and horizontal to form an abutment for the lower end of the body of packing 61. A counterbore 65 enters the upper end of the packer part 60 to carry packing 67 for sealing with the liner portion 19 and the interior of the packer part 60. A nut or gland 66 is threaded into the counterbore 65 to actuate or compress the packing 67.

The packing 67 when tightly compressed in the counter-bore 65 grips the liner portion 19 and bears outwardly against the packer part 60 to form a connection between the liner and the packer part 60. Thus the packing 67 in addition to forming a seal between the liner portion 19 and the packer part 60 operates to releasably or yieldingly connect the packer 12a with the liner 11.

The body of packing 61 is in the nature of a ring of packing material interposed between the packer parts 60 and 62 and is operable to seal outwardly against the wall of the well bore B and to seal inwardly against the liner portion 19. The body of packing 61 may be of hemp or other suitable packing material and when under compression forms an effective seal for preventing the entrance of fluid from the well bore B into the rat-hole H.

The upper part 62 of the packer 12a may be a simple cylindrical drillable member surrounding the liner portion 19 and having a flat lower end for bearing downwardly against the body of packing 61. The upper packer part 62 is shiftable on the liner portion 19 to be urged against the body of packing 61 by the weight or a portion of the weight of the test string S. Means is provided for transmitting the downward force or weight from the test string S to the upper packer part 62. A washer or plate 68 is shiftable on the liner portion 19 and is adapted to engage the upper end of the packer part 62. The plate 68 is engageable by the coupling 18 which transmits the weight or downward force from the string S to the plate which in turn transmits the force to the packer part 62. The packer part 62 may be provided with a basket 69 for sealing with the wall of the well bore B. The basket 69 is expansible being formed of rubber or the like and has its lower end closed. In practice the lower end portion of the basket 69 may be cast in the packer part 62. The basket 69 is annular or tubular and preferably projects a considerable distance above the packer part 62 to have extensive sealing engagement with the wall of the well bore B. The basket 69 is adapted to be actuated or expanded by pressure applied to the fluid in the well bore B or by the hydrostatic pressure of the fluid. It will be apparent that the pressure of fluid in the basket also forces it down and thus aids in making the packing tight, in fact, it may be the sole means of making the packing tight.

In operating the form of apparatus illustrated in Fig. 7 and in carrying out the method of the invention with this form of apparatus the body 10 carrying the liner 11, the packer 12a and the valve 13 is secured to the lower end of the test string S. The test string S is run into the well to a position where the lower end 63 of the packer part 60 bears on the shoulder Y of earth formation. This brings the liner 11 to a position where its perforated lower portion 20 projects into the rat-hole H. To actuate the packer 12a the weight, or a portion of the weight of the string S is permitted to rest on the upper packer part 62 through the coupling 18 and washer 68 and this weight actuates or comprises the body of packing 61. The packing 61 when under compression dependably seals with the wall of the well bore B and the exterior of the imperforate liner portion 19. If desired or believed necessary the basket 69 may be expanded by applying pressure to the fluid standing in the well bore B. The packer 12a thus provides two effective longitudinally spaced seals for preventing the entrance of fluid from the well bore B to the rat-hole H.

The valve 13 is then opened in the manner described above in connection with the operation of the form of the invention shown in Figs. 1 to 5, inclusive, of the drawings to permit the fluid from the rat-hole H to flow into the test string. When a sufficient amount of test fluid has been obtained the valve is permitted to close to trap the fluid in the string and the line L is withdrawn from the string S. If pressure has been maintained on the fluid within the well bore B to expand the basket 69 this pressure is relieved and the string S is pulled upwardly to remove the tester from the well bore. As the perforated lower portion 20 of the liner 11 is of downwardly diminishing diameter it is readily pulled from the rat-hole H even though the rat-hole may be sanded up. In most intances the highly compressed packing 69 holds the packer 12a on the liner 11 so that it is withdrawn from the well on the string S. However, in the event that the packer 12a is caught or fixed in the well bore the liner 11 may be pulled upwardly through the packer 12a leaving the packer 12a in the well bore. As the packer 12a is formed principally of drillable material it may be easily broken up and drilled up by a drilling tool when the drilling operations are resumed. Thus the loss of the packer 12a in the well bore does not endanger the well or necessitate a fishing operation. In some instances the lower portion 20 of the liner 11 may be tightly caught in the rat-hole H so that the tester cannot be withdrawn from the well without endangering the joints of the test string S. If this occurs the test string S is pulled upwardly and manipulated to break the liner 11 at its groove 23, permitting the upper portion 20 of the liner, the body 10 and the parts connected therewith to be withdrawn from the well leaving the lower portion 20 of the liner in the well. This may be readily fished from the well or drilled up by the drilling tools.

Figure 8:
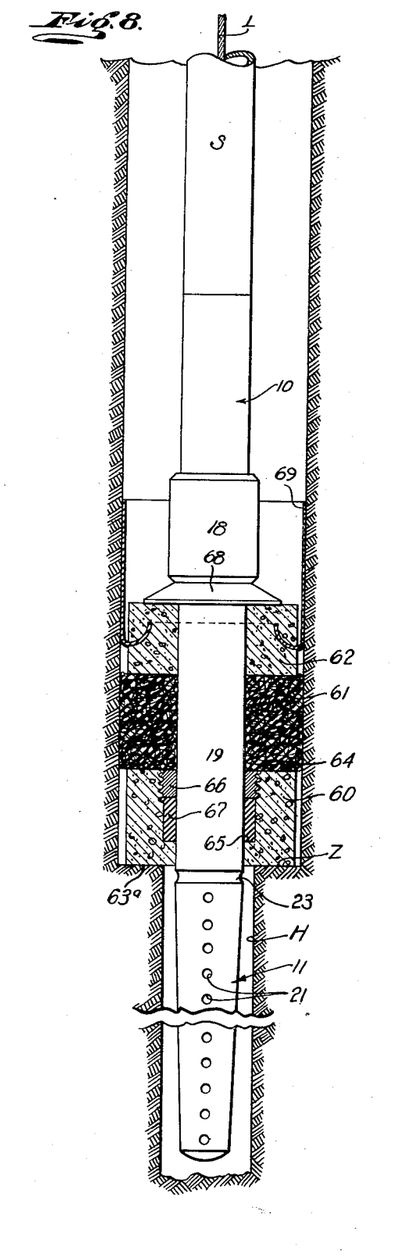
Fig. 8 is a view similar to Fig. 7 showing a slightly modified form of packer and Fig. 9 is a longitudinal detailed sectional view of still another embodiment of the invention showing it in the operative position in the well bore.

Fig. 8 illustrates an embodiment of the invention intended for use in a well having a substantially horizontal shoulder Z at the upper end of the rat-hole H. The apparatus shown in Fig. 8 of the drawings is identical with the apparatus illustrated in Fig. 7 except that the lower sealing face 63a of the lower packer part 60 is flat and substantially horizontal to seal with the substantially horizontal shoulder Z of earth formation. The operation of the apparatus shown in Fig. 8 of the drawings may be the same as that of the apparatus illustrated in Fig. 7.

Figure 9:
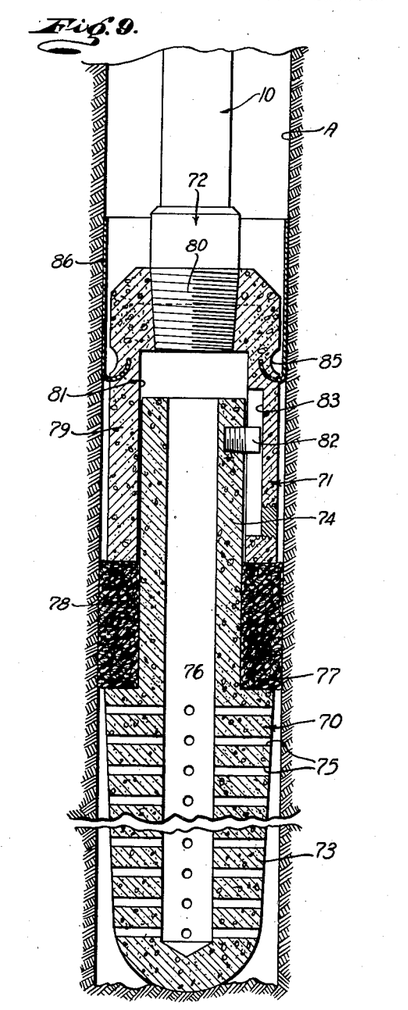

In Fig. 9 of the drawings we have illustrated an embodiment of the invention adapted for use in a well bore A devoid of an upwardly facing shoulder and adapted for use in a portion of a well of substantially uniform diameter. The well testing apparatus illustrated in Fig. 9 of the drawings includes, generally, a body 10 housing or containing the valve 13 described above, a drillable liner 70 and a packer 71 slackly connecting the liner 70 with the body 10.

The body 10 housing the control valve 13 may be identical with the body 10 described above. An adapter or coupling 72 is provided on the lower end of the body 10 to connect the packer 71 with the body 10. The liner 70 is provided to receive the well fluids from the lower portion of the well bore A or from a selected portion of the well. In accordance with this embodiment of the invention the liner 70 is frangible or drillable being formed of glass, cement, Bakelite or other material that may be readily drilled up by a drilling tool. The liner 70 may be a simple, integral member comprising a perforated or ported lower portion 73 and an imperforate upper portion 74. The lower portion 73 of the liner may have a comparatively thick wall as illustrated and is provided with a multiplicity of lateral ports 45 communicating with the longitudinal opening 76 of the liner. The lower portion 73 of the liner 70 is of larger external diameter than the upper portion 74 providing an upwardly facing annular shoulder 77. In accordance with the invention the perforated lower portion 73 of the liner 70 is tapered downwardly and inwardly or is of downwardly diminishing external diameter to be readily withdrawn from the well bore in the event the bore caves in or sands up. The lower end of the liner 70 may be closed by an integral wall as shown in the drawings. The upper portion 74 of the liner 70 may be cylindrical and of uniform diameter.

The packer 71 comprises a tubular friable member 79 attached to the coupling 72 and a body of packing 78 interposed between the lower end of the member 79 and the shoulder 77. The member 79 is friable being formed of cement, glass, Bakelite or other drillable material that may be drilled up by drilling tools. The member 79 of the packer 71 may be connected with the coupling 72 by heavy left-hand threads 80 whereby the body 10 may be disconnected from the packer and liner if found necessary. The longitudinal opening 81 of the member 79 shiftably receives the upper portion 74 of the liner 70. The invention provides a slack connection between the member 79 and the liner 70. The slack connection may comprise a projection or pin 82 on the upper portion 74 of the liner operable or shiftable in a longitudinal slot 83 in the interior of the member 79. When the liner 70 is resting on the bottom of the well bore A the member 79 is adapted to move downwardly to compress the packing 78 against the shoulder 77. In the preferred construction the packer member 79 is weakened so that it may be broken by manipulation of the string S in the event that it becomes caught in the well bore. An annular weakening groove 85 is provided in the upper portion of the member 79 adjacent the lower end of the coupling 72. An expansible basket 86 is provided on the member 79 to seal with the wall of the well bore A. The basket 86 is a tubular member of rubber or the like and its lower end is closed by being suitably secured to the exterior of the member 79. It is preferred to form the basket 86 comparatively long to project a substantial distance upwardly from its point of connection with the member 79. The basket 86 is expansible by the hydrostatic pressure of the fluid in the well bore A or by pressure applied to the fluid in the well to tightly seal outwardly against the wall of the well. In practice the basket 86 is formed of rubber or the like to be readily expansible and to readily conform to irregularities of the well bore and thus provide an effective dependable seal.

The packing 78 is an annular body of hemp or other packing material interposed between the lower end of the member 79 and the shoulder 77. Downward pressure on the packing 78 is adapted to expand it and force it into sealing engagement with the wall of the well bore A and with the periphery of the liner portion 74.

In operating the apparatus illustrated in Fig. 9 of the drawings and in carrying out the method of the invention with this form of apparatus the body 10 carrying the valve 13, the packer 71 and the liner 70 is secured to the lower end of the test string S and the string is run into the well bore A. The string is run in the well to bring the lower end of the liner 70 against the bottom of the bore. The weight or a portion of the weight of the string S is then allowed to settle and this downward force is transmitted by the member 79 to the packing 78 to compress or actuate the packing. If desired pressure may be applied to the fluid standing in the well to expand the basket 86 so that it effectively seals with the wall of the well bore A. The packer 71 thus provides two longitudinally spaced seals for preventing the entrance of fluid from the main portion of the bore A to the lower end portion of the bore containing the perforated part 73 of the liner.

Following the actuation of the packer 71 the valve 13 is opened as described above to permit the fluid from the lower end portion of the well to flow through the ports 75 and the opening 76 into the body 10 and the string S. This fluid from the stratum penetrated by the lower end of the well bore is free to flow upwardly through the test string S under substantially normal pressures. If under sufficient pressure and in sufficient volume the fluid produced by the stratum being tested may flow from the upper end of the test string S. When a sufficient amount of test fluid has been obtained the valve 13 is permitted to close and the line L is withdrawn from the test string. The weight imposed on the packer 71 is then removed and the test string S is pulled upwardly to withdraw the tester from the well. In most instances the packer 71 and the liner 70 may be readily pulled from the well bore on the string S. The taper of the liner 70 provides for its easy removal. In the event that the liner 70 becomes immovably sanded in the well it may be necessary to pull the test string upwardly until the portion of the liner at the pin 82 or the pin 82 fails permitting the member 79 to move upwardly free of the liner 70 leaving the liner in the well bore. The liner 70 being formed of drillable material may be easily drilled up when the drilling operations are resumed without necessitating a fishing operation. In some cases the member 79 of the packer 71 may become caught in the well bore. If this occurs the member 79 may be readily broken at the weakening groove 85 so that the body 10 carrying the valve 13 may be withdrawn from the well on the string S leaving a portion of the member 79 and the friable packer 70 in the well. These parts may be easily broken and drilled up by a drilling tool when the well is to be deepened.

Having described only typical preferred forms and applications of our invention, we do not wish to be limited or restricted to the specific details herein set forth, but wish to reserve to ourselves any modifications or variations that may appear to those skilled in the art or fall within the scope of the following claims.

Having described our invention, we claim:

1. The method of testing the formation in a well comprising the positioning of a perforated liner in the well carrying a drillable packing means by lowering the same into the well on a test string, allowing the test fluid to enter the perforated liner directly from the well, removing the test fluid from the liner and test string, removing the string from the well to withdraw the said liner leaving the packing means in the well, and then drilling up the packing means remaining in the well to leave the well clear for further operations.

2. The method of testing the formation in a well comprising the positioning of a liner in the well carrying a drillable packing means by lowering the same into the well on a test string, removing the test fluid from the liner and test string, disconnecting the liner from the packing means, removing the liner from the well by withdrawing the string from the well to pull the liner through the packing means and raise it from the well leaving the packing means in the well, and then crushing up the packing means to leave the well clear for other operations.

3. The method of testing the formation in a well comprising the positioning of a liner removably carrying a drillable packer in the well to receive the fluid from the formation by lowering the liner into the well on a test string, actuating the packer to seal off the well above the zone being tested, removing the fluid from the formation through the liner and string, removing the liner from the well by pulling the string from the well to pull the liner through the packer and raise it from the well leaving the packer in the well, and then drilling up the packer to leave the well clear for other operations.

4. The method of testing the formation in a well comprising the positioning of a perforated liner removably carrying a drillable packer in the well to receive the fluid from the formation by lowering the liner into the well on a test string, actuating the packer to seal off the well above the zone being tested by manipulation of the string, causing the fluid to pass directly from the formation and well into the perforated liner and then into the string, disconnecting the line from the packer, removing the liner from the well by raising the string to pull the liner upwardly through the packer and out of the well leaving the packer in the well, and then drilling up the packer to leave the well clear for other operations.

5. The method of testing the productivity of the formation in a well including providing a liner and a packing means arranged on the liner and operable by fluid pressure, arranging the assembly of the liner and packing means in the well by lowering it into the well on a test string, actuating the packing means to seal off the well by applying pressure to the fluid in the well, removing the well fluid from below the packing means through the string, and then removing the liner from the well by pulling the string from the well to pull the liner upwardly through the packing means and raise it from the well leaving the packing means in the well.

6. The method of testing the productivity of the formation in a well including providing a liner and a drillable packing means detachably arranged on the liner and operable by fluid pressure, arranging the assembly of the liner and packing means in the well by lowering it into the well on a test string, actuating the packing means to seal off the well by applying pressure to the fluid in the well, removing the well fluid from below the packing means through the string, detaching the liner from the packing means, removing the liner from the well by pulling the string from the well to pull the liner upwardly through the packing means and raise it from the well leaving the packing means in the well, and then drilling up the packing means to leave the well clear for other operations.

7. A well tester comprising a liner adapted to be connected with a test string, the liner having an opening for admitting fluid from the well formation, and a drillable packer surrounding the liner and detachably frictionally engaged with the liner to pack between the liner and the wall of the well and pass the liner upon the liner being pulled from the well.

8. In a well tester, a liner for receiving the fluid from the formation to be tested, a drillable packer for sealing off the well around the liner above the zone to be tested, and means for releasably connecting the packer to the liner releasable when the packer is caught in the well to permit withdrawal of the liner through the packer.

9. In a well tester, a liner for receiving the fluid from the formation to be tested, a drillable packer for sealing off the well above the zone to be tested, and means for sealing with the liner and packer releasably frictionally connecting the packer with the liner to permit withdrawal of the liner through the packer when the packer is caught in the well.

10. In a well tester, a perforate liner, and a packer slidably fitting around the upper portion of the liner, the liner being of downwardly diminishing transverse dimensions from adjacent the packer to its lower end.

11. In a well tester, a packer having a part for sealing between the tester and the wall of the well, and an expansible upwardly facing basket attached to the packer at a point spaced below the upper end of the packer and extending upwardly around and over a portion of the packer for sealing with the wall of the well.

12. A device for use in combination with a well tool including, a drillable packer having a part for sealing between the tool and the well wall, and an expansible upwardly facing basket on the packer operable to seal with the wall of the well under the expanding influence of fluid pressure in the well above the packer.

13. In apparatus of the character described, a drillable packer, a surface on the packer for sealing with a shoulder in the well, and an expansible upwardly facing skirt on the packer operable to seal with the wall of the well under the expanding influence of fluid pressure in the well above the shoulder.

14. In well testing apparatus, a drillable part adapted to seal against a shoulder in the well, an upper drillable part adapted to be forced downwardly relative to the first mentioned part, and packing between the parts expansible to seal with the wall of the well by such downward movement.

15. In a well tester, a liner for receiving the fluid from the formation to be tested, a drillable packer for sealing off the well above the zone to be tested, and means for releasably connecting the packer to the liner to permit withdrawal of the liner through the packer, said means including spring members on the packer bearing on the liner.

16. A well tester comprising a tubular body adapted to be connected with the lower end of a test string, a liner on the body for receiving the fluid from the formation being tested, a packer associated with the liner to seal off the portion of the well being tested, and a valve in the body for controlling the flow into the test string comprising a shiftable tube normally in a down position where it closes the interior of the body and means normally yieldingly holding the tube in said down position, the tube having a plurality of longitudinally spaced ports to progressively increase the extent of communication of the string with the liner as the tube is moved upwardly relative to the body and test string.

17. A well tester comprising a tubular body adapted to be connected with the lower end of a test string, a liner on the body for receiving the fluid from the formation being tested, a packer associated with the liner to seal off the portion of the well being tested, and a valve in the body for controlling the flow into the test string comprising a tube shiftable relative to the test string and normally in a down position where it closes the interior of the body and having a plurality of longitudinally spaced ports to progressively increase the extent of communication of the string with the liner as the tube is moved longitudinally, and means for shifting the tube upwardly relative to the test string.

18. In a well tester, a liner having a perforated portion for receiving fluid from the well and having a weakened portion whereby it may be parted at said portion in the event it becomes caught in the well.

19. Well testing apparatus comprising a tubular test string, and a tubular structure connected with the lower end of the string adapted to receive the fluid from the formation being tested, said structure being weakened at a point above its lower end to be readily parted at said point in the event it becomes caught in the well.

20. A well tester comprising a metal liner to be connected with a test string and having an opening for admitting fluid from the well formation, and a drillable packer associated with the liner for packing with the well wall, the liner and packer being fitted to allow the liner to be moved through the packer to leave the packer in the well when the liner is withdrawn from the well.

21. In well testing apparatus, a lower part for sealing against a shoulder in the well, an upper part adapted to be forced downwardly relative to the lower part, packing between the parts expansible against the wall of the well by such downward movement of the upper part, and an expansible basket on the upper part expanded to seal with the wall of the well by the downwardly acting fluid pressures in the well.

22. In a well tester, a liner for receiving the fluid from the formation to be tested, a drillable packer for sealing off the well above the zone to be tested, and means releasably connecting the packer to the liner releasable to permit withdrawal of the liner through the packer when the tester is in the well.

23. In a well tester, the combination of, a tubular test string, an elongate liner connected with the test string and perforated to admit fluid from the well, and valve means controlling the flow of fluid from the liner to the string operable to allow substantially free flow from the liner to the string, the liner being longitudinally tapered throughout the major portion of its length to be readily withdrawn from the well.

ARTHUR L. ARMENTROUT.
ELWIN B. HALL.